July 5, 1927.  1,634,486
J. A. BRIED
CHILD'S FOOT POWER AUTOMOBILE
Filed April 30, 1925
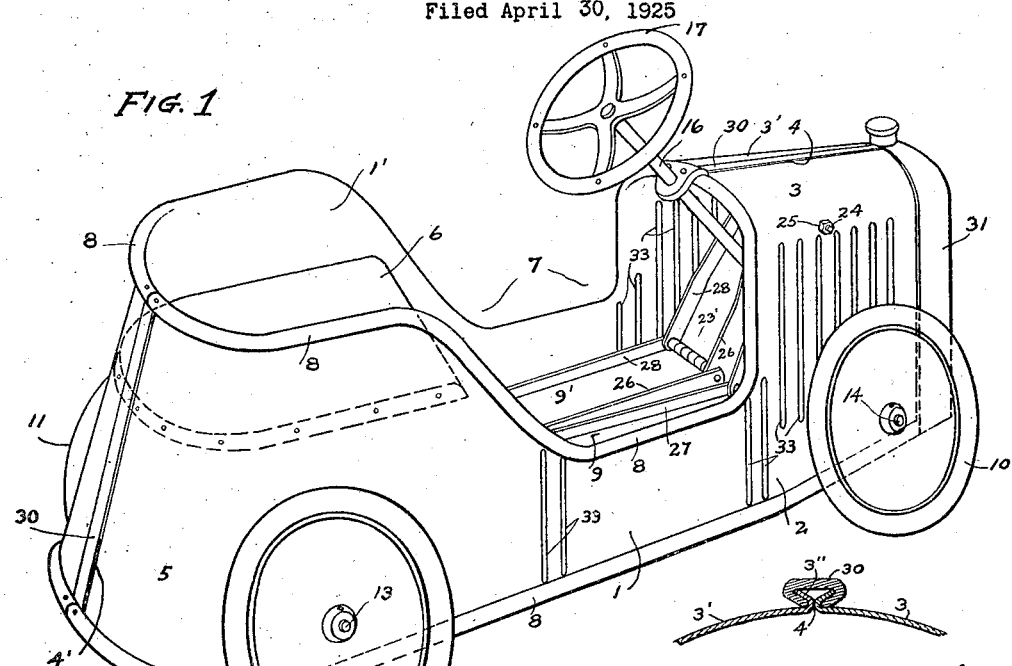
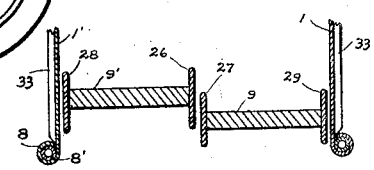
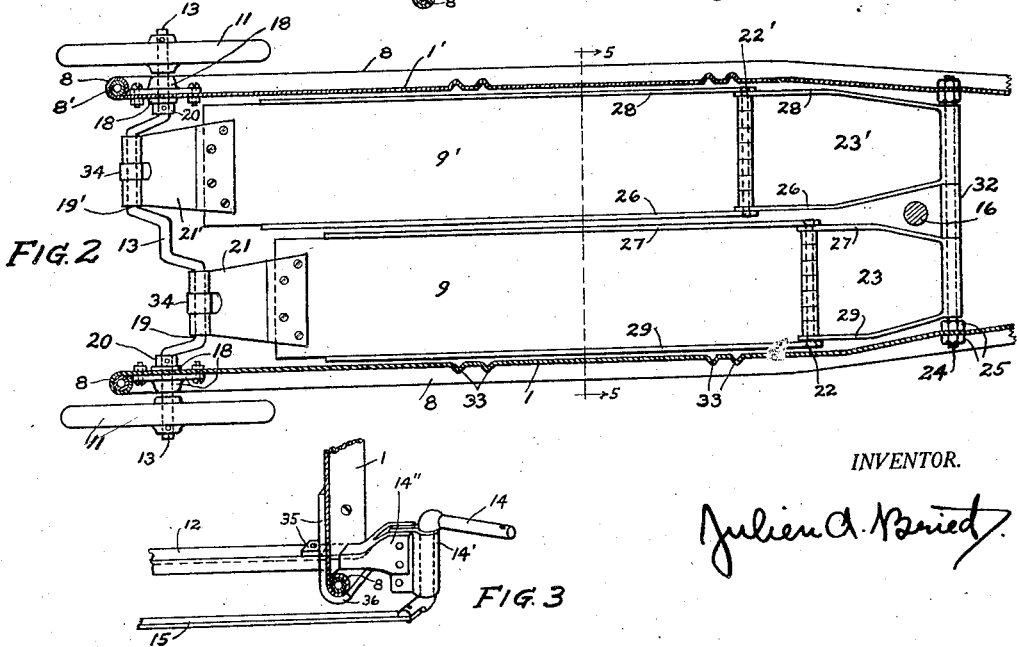
INVENTOR.
Julien A. Bried Patented July 5, 1927.

1,634,486

UNITED STATES PATENT OFFICE.

JULIEN A. BRIED, OF OAKLAND, CALIFORNIA.

CHILD'S FOOT-POWER AUTOMOBILE.

Application filed April 30, 1925. Serial No. 27,029.

This invention relates to small foot propelled automobiles as used by children in play.

The objects of my invention are to provide a foot propelled, or juvenile automobile of this character which will be simple and cheap in construction, which will be more adapted to the very small or young child than are the vehicles now in use, in having a novel treadle arrangement in relation to the body of the vehicle, safer than the present treadle arrangement in overcoming the danger of a child rider upsetting with its feet caught in the treadles, as commonly now experienced.

Before describing my invention, it will be better to draw attention to the fact that as far as can be observed, all foot power automobiles as now used by children on the city side-walks are of one type only,—they have a two sided body including a seat, and arranged between the sides and under the body they have the old and well known girl's tricycle treadle drive connected to a pair of cranks on the rear axle.

This construction implies that when such a vehicle upsets, as is often the case, the child's feet being within or projecting through the body on skeleton treadles, get tangled up with the treadle members, or between them and the body of the vehicle, in its effort to save itself, with the result that if it cannot extricate itself in time it receives a bad injury in the upset, which is very likely over the curb into the gutter.

From the construction outlined it is evident that these vehicles as now made are not suitable for very small or young children, and who have therefore been heretofore obliged to ride on the little velocipede-like vehicles in which the child sits astride with feet touching the ground, as no attempt has been made to suit a foot power automobile to their use.

My invention shown in the accompanying drawings, provides a foot power automobile-like vehicle suitable for the very small or young child and overcomes the dangers above mentioned in having the treadles arranged within the body in a manner to spread over the entire space within the sides of the vehicle so as to form a floor as it were, with no place for the feet of a very small child to get caught.

In addition to this the sides of the body are of novel construction dropped lower to the ground than the usual construction so as to prevent the feet of a child on the treadles going below the sides and getting caught thereunder, and the sides are also cut out more above the treadles, or to a lower point, to facilitate stepping in and out of the vehicle.

In the drawings hereto Figure 1 is a perspective view of my improved child's automobile indicating the operating treadles within as forming substantially a complete floor for the body, Figure 2 is a broken plan showing the body in section and showing the relation of the treadles to the sides of the body, and the rear driving connections to the axle, Figure 3 is a detail of one of the front steering knuckles and front axle connection to the body, Figure 4 is a cross sectional detail of the sheet metal body seams, and Figure 5 is a cross sectional elevation of the treadles and sides of the body showing the side flanges on the treadles, the section being taken on the line 5—5 of Figure 2.

In further detail Figure 1 shows a sheet metal automobile-like body having two sides 1 and 1' parallel for the major length of the machine and converging slightly in front from the point 2 and arched over the top to form a hood at 3 and 3' and joined along a seam 4 at the center of the hood, while at the rear end the sides are arched around at 5 to form a "roadster" body and also seamed vertically at 4' in the center in a similar manner to the hood seam.

A seat 6, preferably positioned below the upper edges of the sides, is secured within the rear curved end of the vehicle thereby spacing the sides, and the body is cut down between the seat and hood to form an opening 7 for easy stepping in and out of the child.

Around the entire edge of this opening, hood, and also above the seat, the sheet metal body is extremely heavily beaded or rolled outwardly as shown at 8, preferably over a tube 8' so that it will be stiff though made of very thin metal, and the large bead will be substantial for a little child's fingers to grip in climbing in and out.

The lower edge of the body is similarly beaded so as to insure stiff straight sides for the free working of the floor-like treadles 9 and 9' within.

The sides, it should be observed, extend considerably below the centers of the front and rear wheels 10 and 11 respectively, and the axles 12 and 13 extend through the sides of the vehicle above the rolled edge.

The front axle 12 is preferably a channel and carries at each end the front wheel steering knuckles as at 14 in Figure 3 each supported in a bearing bracket 14' riveted to a flattened end 14'' of the channel axle, and a drag link 15 connects in any simple manner, not shown, to the steering post 16 operated by the steering wheel 17. The channel axle 12 is preferably secured to the sides of the body by means of a reinforcing plate 35 bent at 36 to embrace the lower rolled edge of the body.

The rear axle 13 extends through removable bearings 18 secured to the sides and projecting inwardly therethrough, and has a road wheel 11 at both ends, either one or both being secured thereto for driving the vehicle through means of the treadles.

Within the body sides 1 and 1' the rear axle 13 is provided with cranks 19, 19' and outside of the cranks are spacing collars 20 lying against the bearings.

Also within the body sides and lying parallel therewith are two freely oscillatory treadles 9 and 9' each having an upwardly extending bracket 21 and 21' at its rear end pivotally embracing a crank on both sides of a felt oiling ring 34.

At the forward ends of the treadles they are pivoted at 22, 22' to upwardly extending plate-like links 23, 23' respectively, in turn both pivoted to a transverse rod 24 extending through the body under the hood portion and having nuts 25 at each end clamping and spacing the sides, and a collar 32 on the rod spaces the links thereon.

The links and treadles are preferably of sheet metal construction, or combined wood and metal, with upwardly turned edges 26, 27, 28 and 29, the outer edges or flanges 28 and 29 lying within a fraction of an inch of the vertical sides of the body, and the inner flanges 26 and 27 lying a similar distance from one another and being high enough so that no opening will ever show between the links or treadles in their operative movement as might be liable to catch the toe of a child in riding the vehicle, or even the finger of the child in climbing on or in the device.

In practice I find it best to extend the flanges both above and below the treadles and links as shown, so as to gain the desired result without having an objectional height of flange projecting above them.

In operation the treadles are oscillated on their pivotal suspension 22 and 24 by the child in the usual manner as with the present tricycle drives, to propel the vehicle through the rear crank connections, but it will be evident that in no manner can the feet become caught in the treadles as is possible with the type of foot propelled juvenile automobiles now used by the larger children everywhere.

The body of my vehicle consists preferably of two pieces only of sheet metal joined at the seams 4 and 4' as described, tho more seams may be used if desired. The preferred form of joint is as shown in Figure 4 wherein the two sides 3 and 3' of the hood at the joint 4 are both bent outwardly at the edges as indicated at 3'' and are locked together by a heavy channel member 30 which is slipped over both edges 3'' after which the channel is simply flattened down to straighten the legs of the channel and thereby crimp all together in a firm seam.

The extreme forward end of the body is closed by a radiator 31 of any suitable design, and which radiator is secured to the sides by any desired means to hold them to the desired curved form with vertical sides.

Along the sides of the body the sheet metal sides have a number of small ribs 33 struck outwardly from within the body for the purpose of insuring alignment of the sides for the free working of the closely fitting treadles and yet permit the use of extremely thin metal as is contemplated.

In considering my appended claims it is to be understood that while I show a common crank connection to the treadles as being a sufficient drive for a very small child, any of the various well known crank substitutes or other drives may be substituted if desired, as the invention has little to do with the specific driving connection of the treadles, but broadly to the treadle relation to the body, and their mutual construction by means of which the advantages outlined are secured.

I claim:

1. A child's foot propelled automobile comprising a body having two sides and a seat adapted to support a child with its feet positioned between the sides, wheels supporting the vehicle, and a pair of treadles longitudinally arranged within the body adapted to receive the child's feet and arranged for propelling the vehicle thereby, said treadles substantially filling the body space between the sides and arranged to cooperate with said sides to prevent the formation of foot catching interstices therebetween in the operation of the treadles.

2. A child's foot propelled automobile comprising a body having two sides and a seat embraced between the sides adapted to support a child with its feet positioned between the sides, wheels supporting the vehicle, treadle operating means within the body adapted to receive the feet of the child and substantially filling the space between the sides of the body forming a floor for the vehicle body within and at the lower part thereof.

3. A vehicle of the character described comprising a body having two sides, and wheels supporting the body, foot treadle means arranged for propelling the vehicle positioned between said sides forming substantially a bottom for the body and operative substantially within the upper and lower limits of the sides.

4. A foot propelled vehicle of the character described comprising a body having two sides and a seat adapted to support a rider with its feet positioned between the sides, wheels supporting the vehicle, and a pair of treadles longitudinally arranged between the sides adapted to receive the rider's feet, said treadles each comprising a flat foot receiving portion forming together substantially a floor for the body, connected at their rear ends for driving the vehicle, and pivoted at their forward portions each to a link portion in turn pivoted to the vehicle at a point above the treadle.

5. A vehicle of the character described comprising a body having two sides, wheels supporting the body, treadles arranged between the sides adapted for driving the vehicle and forming substantially a floor for the body, said treadles being provided with vertically extending flanges.

6. A child's foot power automobile comprising a sheet metal wheeled body having two vertical sides, a hood, and an opening between the hood and the rear end adapted to receive a child rider, said opening having a rolled edge extending entirely around the same, and a rolled edge along the bottom of the sides, a seat positioned below the rolled edge within the opening remote from the hood, and treadle means adapted to receive the feet of a child seated upon the seat to propel the vehicle operative between the vertical sides and forming substantially a bottom for the body.

7. A child's foot power automobile comprising a wheeled body having spaced vertical sides, a seat between the sides adapted to support a child, treadle propelling means between the sides adapted to receive the feet of the child, front and rear axles supporting respectively front and rear wheels and passing transversely through the body above the lower edge thereof.

8. In a structure as specified in claim 4 vertically extending flanges on the treadles and on the link portions.

JULIEN A. BRIED.